US009569230B2

United States Patent
Pyhälammi et al.

(10) Patent No.: US 9,569,230 B2
(45) Date of Patent: Feb. 14, 2017

(54) NETWORK ENTITY, TERMINAL, COMPUTER-READABLE STORAGE MEDIUM AND METHOD FOR PROVIDING WIDGETS INCLUDING ADVERTISEMENTS FOR ASSOCIATED WIDGETS

(75) Inventors: Seppo Pyhälammi, Helsinki (FI); Tuomo Sihvola, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1475 days.

(21) Appl. No.: 11/753,786

(22) Filed: May 25, 2007

(65) Prior Publication Data

US 2008/0294998 A1 Nov. 27, 2008

(51) Int. Cl.
*G06F 9/44* (2006.01)
(52) U.S. Cl.
CPC .................................. *G06F 9/4443* (2013.01)
(58) Field of Classification Search
CPC ..................................................... G06F 9/4443
USPC ......................................................... 715/810
See application file for complete search history.

(56) References Cited

U.S. PATENT DOCUMENTS

| | | | |
|---|---|---|---|
| 6,317,761 B1* | 11/2001 | Landsman et al. ........... | 715/205 |
| 6,336,131 B1 | 1/2002 | Wolfe | |
| 6,766,946 B2* | 7/2004 | Iida et al. ..................... | 235/381 |
| 6,892,226 B1* | 5/2005 | Tso et al. ..................... | 709/218 |
| 7,032,177 B2* | 4/2006 | Novak et al. ................. | 715/723 |
| 7,490,295 B2 | 2/2009 | Chaudhri et al. | |
| 7,516,104 B1* | 4/2009 | Scardino ...................... | 705/58 |
| 7,865,532 B2* | 1/2011 | Drukman et al. ............ | 707/802 |
| 2003/0222899 A1* | 12/2003 | Alvesalo ...................... | 345/716 |
| 2005/0055644 A1* | 3/2005 | Stockton ..................... | 715/766 |
| 2005/0108095 A1* | 5/2005 | Perlmutter ................... | 705/14 |
| 2006/0149630 A1* | 7/2006 | Elliott et al. ................. | 705/14 |
| 2007/0066365 A1* | 3/2007 | Minear et al. ............... | 455/566 |
| 2007/0101291 A1 | 5/2007 | Forstall et al. | |

(Continued)

FOREIGN PATENT DOCUMENTS

| | | |
|---|---|---|
| CN | 1592213 A | 3/2005 |
| RU | 2009148134 A | 6/2011 |

(Continued)

OTHER PUBLICATIONS

International Search Report for Application No. PCT/IB/2008/052028.
Michael Arrington;*Attack of the Advertising Widgets*; May 6, 2007; available at <http://www.techcrunch.com/2007/05/06/attack-of-the-advertising-widgets> (visited May 21, 2007).
International preliminary report on patentability for corresponding international application No. PCT/IB2008/052028 dated Dec. 1, 2009, pp. 1-7.

(Continued)

*Primary Examiner* — Ryan Pitaro
(74) *Attorney, Agent, or Firm* — Ditthavong & Steiner, P.C.

(57) ABSTRACT

A network entity is provided and includes a processor that is configured to send a first widget to a mobile terminal. The first widget is associated with a second widget, and the mobile terminal is configured to present content of the first widget in a display of the mobile terminal and in a manner including a content item related to the second widget. The processor is therefore also configured to receive, from the mobile terminal, a request for the second widget based on the presentation of content of the first widget including the content item related to the second widget. Further, the processor is configured to send the second widget to the mobile terminal in response to the request, where the mobile terminal is configured to receive the second widget and present content of the second widget in the display.

49 Claims, 9 Drawing Sheets

(56) References Cited

U.S. PATENT DOCUMENTS

| | | | |
|---|---|---|---|
| 2007/0112630 A1* | 5/2007 | Lau et al. | 705/14 |
| 2007/0118813 A1* | 5/2007 | Forstall et al. | 715/805 |
| 2008/0034314 A1* | 2/2008 | Louch | G06F 3/0481 715/778 |
| 2008/0040426 A1* | 2/2008 | Synstelien et al. | 709/203 |
| 2008/0082627 A1 | 4/2008 | Allen et al. | |
| 2008/0141153 A1 | 6/2008 | Samson et al. | |
| 2008/0222232 A1 | 9/2008 | Allen et al. | |
| 2009/0024482 A1 | 1/2009 | Synstelien et al. | |
| 2009/0024944 A1 | 1/2009 | Louch et al. | |
| 2009/0044144 A1* | 2/2009 | Morris | 715/804 |
| 2009/0254824 A1* | 10/2009 | Singh | 715/716 |
| 2011/0007212 A1* | 1/2011 | Lee et al. | 348/468 |

FOREIGN PATENT DOCUMENTS

| | | |
|---|---|---|
| RU | 2463727 C2 | 10/2012 |
| WO | WO 00/33197 A | 6/2000 |

OTHER PUBLICATIONS

Office action for related U.S. Appl. No. 12/121,838 dated Feb. 8, 2011, pp. 1-25.
Russian Office action for corresponding RU application No. 2009148134/08 dated Jan. 24,.
Korean Office action for corresponding KR application No. 10-2009-7026862 dated Apr. 27, 2011, pp. 1-16.
Office action for related U.S. Appl. No. 12/121,838 dated Jul. 25, 2011, pp. 1-19.
Russian Office action for corresponding RU application No. 2009148134/08 dated Aug. 15, 2011.
Chinese Office Action for related Chinese Application No. 200880017549.4 dated Feb. 29, 2012, pp. 1-9.
Communication pursuant to Article 94(3) EPC for European Application No. 08 751 306.5-1856, dated Mar. 11, 2013, pp. 1-6.
Office Action for corresponding Vietnamese Application No. 1-2009-02812, dated Oct. 28, 2014, 2 pages.
European Office Action for related European Application No. 08751306.5-1870 dated Jan. 16, 2015, 4 pages.

\* cited by examiner

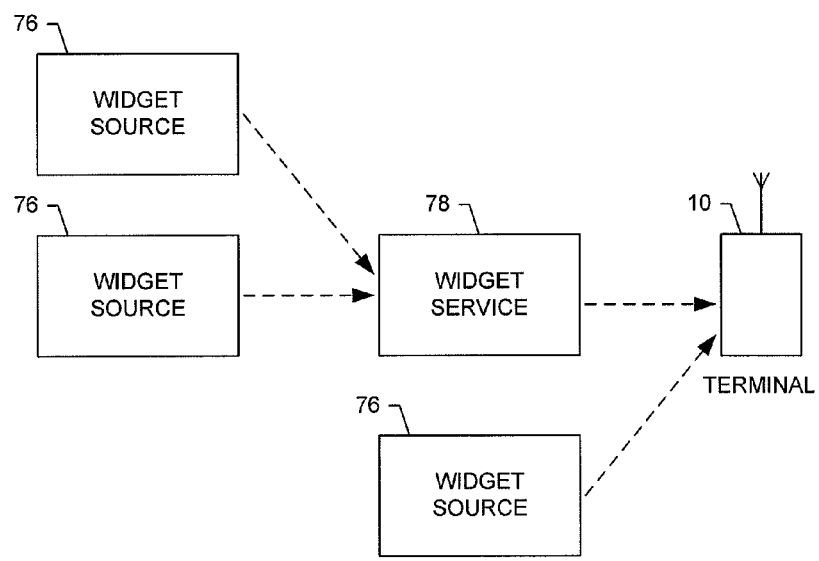
FIG. 4.
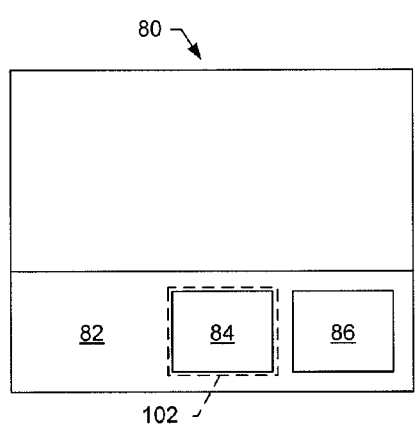
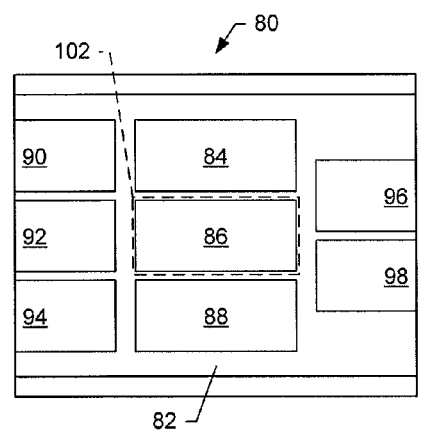
FIG. 5a.  FIG. 5b.

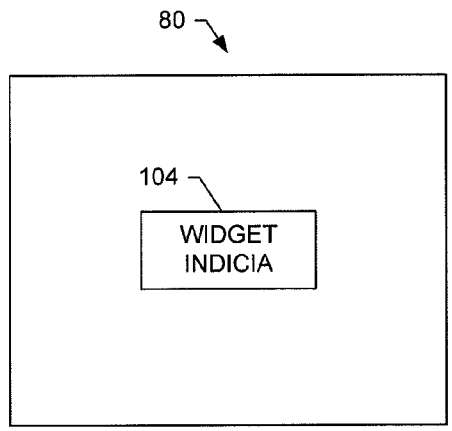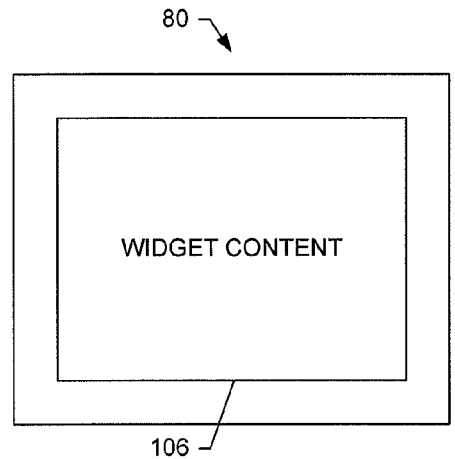
FIG. 6a.  FIG. 6b.
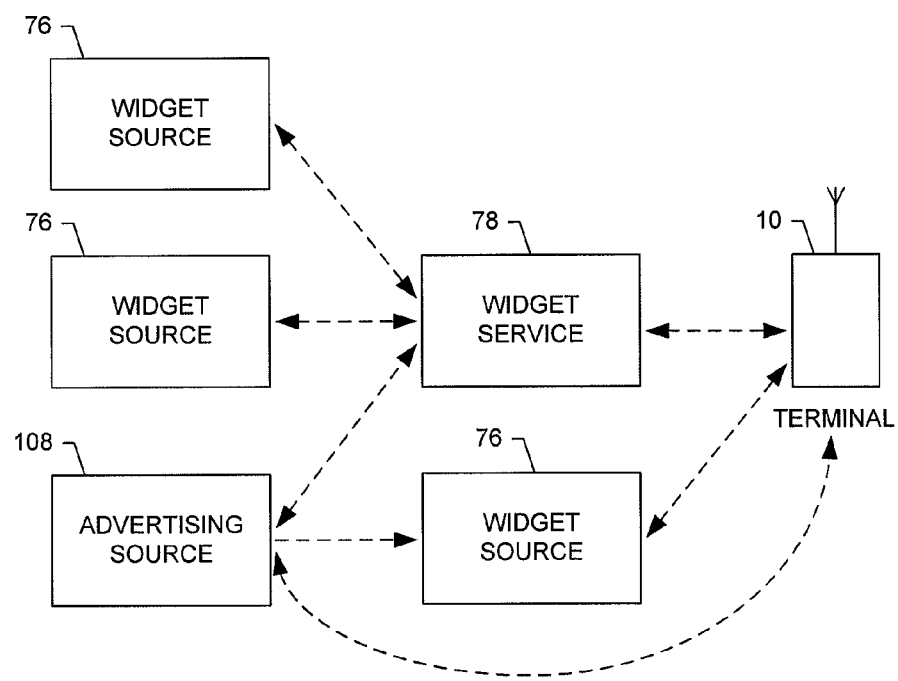
FIG. 7.

| WIDGET ID | STATUS | AD ID |
|---|---|---|
| WIDGET 1 | ACTIVE | AD 7 |
| WIDGET 2 | INACTIVE | AD 3 |
| ... | ... | ... |
| WIDGET $n$ | ACTIVE | AD $m$ |

FIG. 9a.

| AD ID | ADVERTISEMENT |
|---|---|
| AD 1 | ADVERTISEMENT 1 |
| AD 2 | ADVERTISEMENT 2 |
| ... | ... |
| AD $m$ | ADVERTISEMENT $m$ |

FIG. 9b.

| WIDGET ID | STATUS | ITEM ID | AD ID |
|---|---|---|---|
| WIDGET 1 | ACTIVE | ITEM 1 | AD 7 |
| | | ITEM 2 | AD 3 |
| | | ITEM 3 | AD 2 |
| WIDGET 2 | INACTIVE | ITEM 1 | AD 1 |
| | | ITEM 2 | AD 4 |
| | | ITEM 3 | AD 5 |
| ... | ... | ... | ... |
| WIDGET n | ACTIVE | ITEM 1 | AD 1 |
| | | ITEM 2 | AD 3 |
| | | ITEM 3 | AD 2 |

FIG. 13.

| AD ID | ITEM ID | AD ID |
|---|---|---|
| AD 1 | ITEM 1 | ADVERTISEMENT 11 |
| | ITEM 2 | ADVERTISEMENT 12 |
| | ITEM 3 | ADVERTISEMENT 13 |
| AD 2 | ITEM 1 | ADVERTISEMENT 21 |
| | ITEM 2 | ADVERTISEMENT 22 |
| | ITEM 3 | ADVERTISEMENT 23 |
| ... | ... | ... |
| AD m | ITEM 1 | ADVERTISEMENT m1 |
| | ITEM 2 | ADVERTISEMENT m2 |
| | ITEM 3 | ADVERTISEMENT m3 |

FIG. 14.

NETWORK ENTITY, TERMINAL, COMPUTER-READABLE STORAGE MEDIUM AND METHOD FOR PROVIDING WIDGETS INCLUDING ADVERTISEMENTS FOR ASSOCIATED WIDGETS

FIELD OF THE INVENTION

The present invention generally relates to systems and methods of providing widgets to a terminal, and more particularly, relates to providing widgets including advertisements to other, associated widgets to facilitate the terminal user downloading the advertised widgets.

BACKGROUND OF THE INVENTION

Electronic access to and distribution of information has grown in importance as a result of networks such as the Internet connecting individuals on a global scale. Even individuals who are on travel or vacation may connect to communication and information networks through mobile communication devices like mobile telephones. For example, many smartphones allow users to browse the web, check and send e-mails and make telephone calls while they are on the move. Business people, in one instance, may use such devices to seek information involving business news, stock prices and/or weather reports. From a social perspective, information access may further be directed toward obtaining gossip information, web logs (i.e., blogs) and/or traffic alerts.

Typically, an individual must access desired information by manually navigating to a particular site and/or manually searching for the topic of interest. For example, a mobile device user interested in up-to-date stock quotes may enter a particular stock quote web address into a browser and subsequently enter the stock symbol or symbols. In another example, an individual who does not know where to access stock information may enter a search website address to search for stock quotes. The individual may then be required to parse through multiple search results to find a suitable web site. In either case, an individual may have to take several steps before receiving the information they desire.

In an effort to overcome a number of the aforementioned drawbacks, user interface elements commonly referred to as "widgets" have been developed to provide information to users in a more convenient manner. In this regard, a widget may be considered a downloadable, interactive virtual tool (software tool) that provides content such as headline news, exchange rates, sports results, stock quotes, weather forecasts, multilingual phrase dictionaries, encyclopedias, maps, entertainment listings, personal online calendars, or the like to a user. But although widgets may overcome a number of the aforementioned drawbacks, it is usually desirable to improve upon existing technologies, including those related to widgets such as to further improve widget user experience.

SUMMARY OF THE INVENTION

In light of the foregoing background, embodiments of the present invention provide an improved network entity, terminal, computer-readable storage medium and method for providing widgets including advertisements for associated widgets. According to one aspect of exemplary embodiments of the present invention, a network entity (e.g., origin server, digital broadcaster, etc.) is provided and includes a processor. The processor is configured to send a first widget to a mobile terminal. The first widget is associated with a second widget, and the mobile terminal is configured to present content of the first widget in a display of the mobile terminal and in a manner including a content item related to the second widget. The processor is therefore also configured to receive, from the mobile terminal, a request for the second widget based on the presentation of content of the first widget including the content item related to the second widget. Further, the processor is configured to send the second widget to the mobile terminal in response to the request, where the mobile terminal is configured to receive the second widget and present content of the second widget in the display.

More particularly, the processor may be configured to receive, from the mobile terminal, a request for additional content related to the second widget based on the presentation of content of the first widget including the content item related to the second widget. The processor may then be configured to send the additional content to the mobile terminal, where the mobile terminal may be configured to present the additional content in the display. Thus, the processor may also be configured to receive the request for the second widget based on the presentation of the additional content related to the second widget.

The processor may be configured to send, to the mobile terminal, the content item related to the second widget before the mobile terminal presents content of the first widget including the content item related to the second widget. Before sending the respective content to the mobile terminal, however, the processor may be configured to receive, from the mobile terminal, a request for the content item related to the second widget, where the mobile terminal may be configured to send the request based on presentation of an indicia of the first widget. More particularly, for example, the processor may be configured to receive the request from the mobile terminal configured to send the request based on presentation of the indicia of the first widget in a dashboard in the display, whereby the dashboard includes indicia for each of a plurality of widgets. Alternatively, for example, the processor may be configured to receive the request from the mobile terminal configured to send the request based on presentation of the indicia of the first widget in a minimized view of the first widget. And in another alternative, for example, the processor may be configured to receive the request from the mobile terminal configured to send the request based on presentation of content of the first widget in a maximized view of the widget.

According to another aspect of exemplary embodiments of the present invention, a terminal is provided and includes a display, a memory, and a processor. The memory is configured to store a first widget that is associated with a second widget. The processor is configured to present content of the first widget and a content item related to the second widget in the display, where the content item is presented in a predetermined relationship with respect to presentation of the content of the first widget. The processor is further configured to initiate a request, to a network entity, to receive the second widget, the request being initiated based on the presentation of the content item.

The processor of the mobile terminal may be further configured to receive the content item from a network entity before the presentation of the content item. In such instances, the processor may be configured to receive the content item in conjunction with a campaign. In this regard, the campaign may be defined based on one or more geographies, one or more mobile terminal models, one or more user profiles, the first widget and/or a number of times a network entity has distributed the first widget.

The processor may be configured to present content including an indicia of the first widget. In such instances, the processor may be configured to present the content item in place of the indicia of the first widget for at least a predefined period of time. More particularly, for example, the processor may be configured to periodically switch between presenting the indicia of the first widget and the content item. And in another example, the processor may be configured to present the indicia of the first widget in a dashboard including indicia of each of a plurality of widgets.

According to other aspects of the present invention, computer-readable mediums and methods are provided. Embodiments of the present invention therefore provide an improved network entity, terminal and computer-readable storage medium for providing widgets including advertisements for associated widgets. As indicated above, and explained below, exemplary embodiments of the present invention may solve problems identified by prior techniques and provide additional advantages.

BRIEF DESCRIPTION OF THE DRAWINGS

Figure 1:
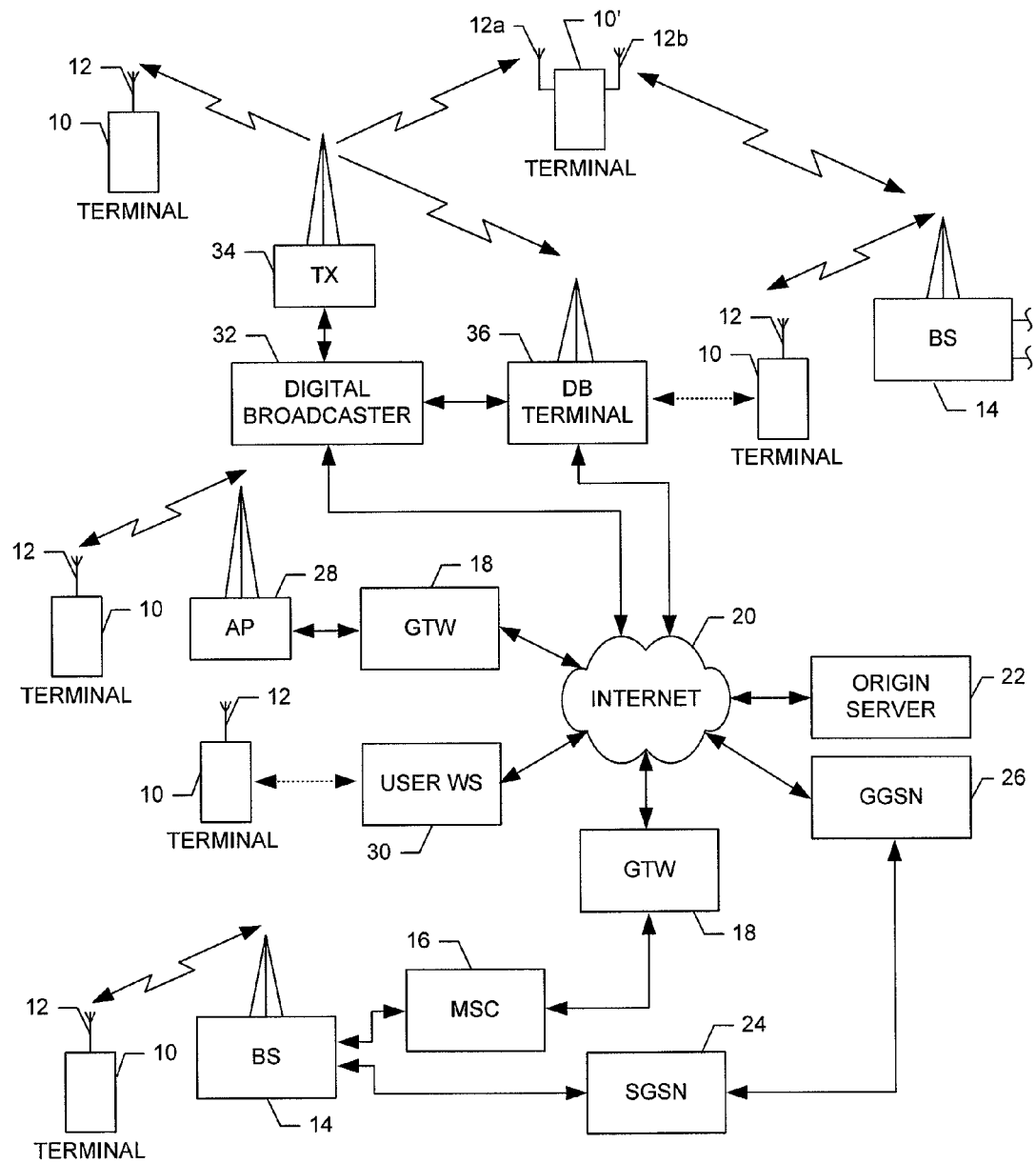
Figure 2:
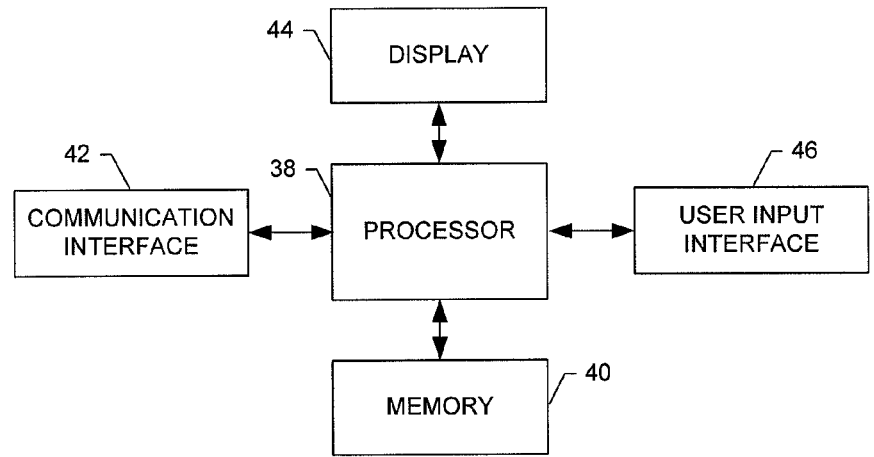
Figure 3:
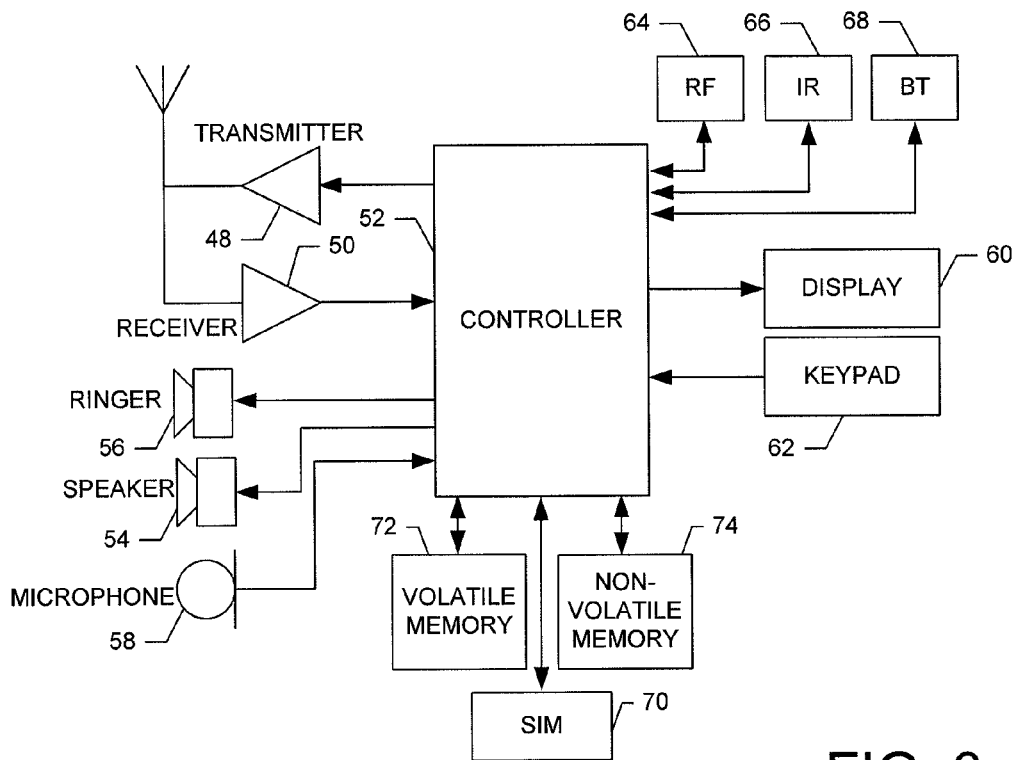
Figure 8:
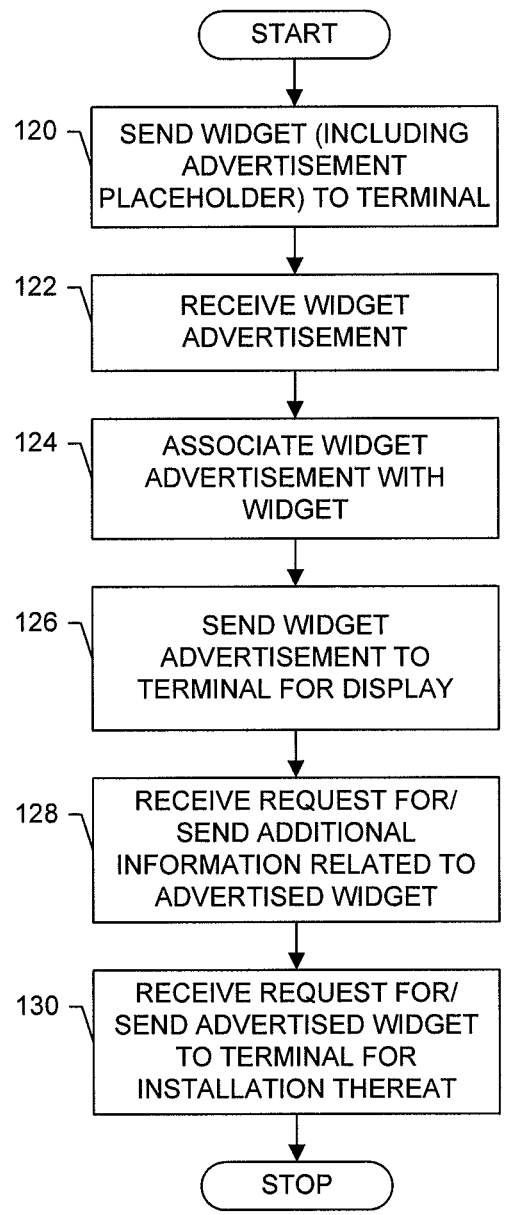

Having thus described the invention in general terms, reference will now be made to the accompanying drawings, which are not necessarily drawn to scale, and wherein:

FIG. 1 is a schematic block diagram of a wireless communications system according to one exemplary embodiment of the present invention including a cellular network and a data network to which a terminal is bi-directionally coupled through wireless RF links;

FIG. 2 is a schematic block diagram of an entity configured to operate as a terminal, origin server, digital broadcast receiving terminal and/or a digital broadcaster, in accordance with exemplary embodiments of the present invention;

FIG. 3 is a more particular schematic block diagram of a terminal, according to exemplary embodiments of the present invention;

FIG. 4 is a functional block diagram of a system for providing widgets to a terminal, according to exemplary embodiments of the present invention;

FIGS. 5a, 5b, 6a and 6b are functional block diagrams of the display of a terminal, according to exemplary embodiments of the present invention;

FIG. 7 is a functional block diagram of a system for providing, to a terminal, widgets including advertisements for associated widgets, according to exemplary embodiments of the present invention;

FIG. 8 is a flowchart including various steps in a method of providing, to a terminal, widgets including advertisements for associated widgets, according to exemplary embodiments of the present invention;

FIGS. 9a and 9b are data tables according to exemplary embodiments of the present invention;

FIGS. 10a, 10b, 10c, 11 and 12 are further functional block diagrams of the display of a terminal, according to exemplary embodiments of the present invention; and FIGS. 13 and 14 are data tables according to other exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of exemplary embodiments of the present invention will be primarily described in conjunction with mobile communications applications. It should be understood, however, that the system, method and computer program product of exemplary embodiments of the present invention can be utilized in conjunction with a variety of other applications, both in the mobile communications industries and outside of the mobile communications industries. For example, the system, method and computer program product of exemplary embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is configured to route calls and messages to and from the terminal when the terminal is making and receiving calls. The MSC also provides a connection to landline trunks when the terminal is involved in a call.

The MSC 16 can be coupled to one or more data networks, such as one or more local area networks (LANs), metropolitan area networks (MANs), and/or wide area networks (WANs). The MSC can be directly coupled to the data network. In one typical embodiment, however, the MSC is coupled to a server gateway (GTW) 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with one or more origin servers 22 or the like, one of which being illustrated in FIG. 1.

In addition to or in lieu of the cellular network, the BS 14 may be part of a packet-switched core network, such as a GPRS core network. In this regard, the BS may be coupled to a signaling GPRS (General Packet Radio Service) support node (SGSN) 24. As known to those skilled in the art, the SGSN is typically configured to perform functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a GTW, such as a GTW GPRS support node (GGSN) 26, and the GGSN is coupled to the Internet.

By coupling the SGSN 24 to the GGSN 26, devices such as origin servers 22 can be coupled to the terminal 10 via the Internet 20, SGSN and GGSN. In this regard, devices such as origin servers can communicate with the terminal across the SGSN and GGSN. For example, origin servers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia Broadcast Multicast Service (MBMS)*, the contents of which are hereby incorporated by reference in its entirety.

In addition to or in lieu of being coupled to the BS 14, the terminal 10 can be coupled to one or more wireless access points (APs) 28. The APs can comprise access points configured to communicate with the terminal in accordance with techniques such as, for example, radio frequency (RF), Bluetooth (BT), infrared (IrDA) or any of a number of different wireless networking techniques, including WLAN techniques. Additionally, or alternatively, the terminal can be coupled to one or more user workstations (WS) 30. Each user workstation can comprise a computing system such as personal computers, laptop computers or the like. In this regard, the user workstations can be configured to communicate with the terminal in accordance with techniques such as, for example, RF, BT, IrDA or any of a number of different wireline or wireless communication techniques, including LAN and/or WLAN techniques. One or more of the user workstations can additionally, or alternatively, include a removable memory configured to store content, which can thereafter be transferred to the terminal.

The APs 30 and the workstations 30 may be coupled to the Internet 20. Like with the MSC 16, the APs and workstations can be directly coupled to the Internet. In one advantageous embodiment, however, the APs are indirectly coupled to the Internet via a GTW 18. As will be appreciated, by directly or indirectly connecting the terminals and the origin server 22, as well as any of a number of other devices, to the Internet, the terminals can communicate with one another, the origin server, etc., to thereby carry out various functions of the terminal, such as to transmit data, content or the like to, and/or receive content, data or the like from, the origin server. As used herein, the terms "data," "content," "information" and similar terms may be used to interchangeably to refer to data configured to be transmitted, received and/or stored in accordance with exemplary embodiments of the present invention. This content may include, for example, multimedia content with audio, video, textual and/or graphical portions. Thus, use of any such terms should not be taken to limit the spirit and scope of the present invention.

Further, the terminal 10 can additionally, or alternatively, be coupled to one or more digital broadcasters 32 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 34, such as a DVB TX. Similarly, the terminal can include a receiver, such as a DVB receiver (not shown). The terminal can be configured to receive content from any of a number of different entities in any one or more of a different number of manners. In one embodiment, for example, the terminal can comprise a terminal 10' configured to transmit and/or receive data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12a for receiving content from the DVB TX, and another antenna 12b for transmitting signals to and for receiving signals from a BS 14. For more information on such a terminal, see U.S. patent application Ser. No. 09/894,532, entitled: *Receiver,* filed Jun. 29, 2001, the contents of which is incorporated herein by reference in its entirety.

In addition to, or in lieu of, directly coupling the terminal 10 to the digital broadcaster 32 via the TX 34, the terminal can be coupled to a digital broadcast (DB) receiving terminal 36 which, in turn, can be coupled to the digital broadcaster 32, such as directly and/or via the TX. In such instances, the digital broadcast receiving terminal can comprise a DVB receiver, such as a DVB receiver in the form of a set top box. The terminal can be locally coupled to the digital broadcast receiving terminal, such as via a personal area network. In one advantageous embodiment, however, the terminal can additionally or alternatively be indirectly coupled to the digital broadcast receiving terminal via the Internet 20.

Referring now to FIG. 2, a block diagram of an entity configured to operate as a terminal 10, origin server 22, digital broadcast receiving terminal 36, and/or a digital broadcaster 32 is shown in accordance with one embodiment of the present invention. Although shown as separate entities, in some embodiments, one or more entities may support one or more of a terminal, origin server, digital broadcast receiving terminal, and/or a digital broadcaster, logically separated but co-located within the entit(ies). For example, a single entity may support a logically separate, but co-located, terminal and digital broadcast receiving terminal. Also, for example, a single entity may support a logically separate, but co-located digital broadcast receiving terminal and digital broadcaster.

The entity configured to operate as a terminal 10, origin server 22, digital broadcast receiving terminal 36, and/or a digital broadcaster 32 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include a processor 38 connected to a memory 40. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform functions associated with operation of the entity in accordance with exemplary embodiments of the present invention. Further for example, and as explained below, the memory can store one or more widgets for providing content such as headline news, exchange rates, sports results, stock quotes, weather forecasts, multilingual phrase dictionaries, encyclopedias, maps, entertainment listings, personal online calendars, or the like to a user.

Although described herein as being implemented in software application(s), it should be understood that any one or more of the functions described herein may alternatively be implemented in firmware or hardware, without departing from the spirit and scope of the present invention. Generally, then, the terminal 10, origin server 22, digital broadcast receiving terminal 36, and/or a digital broadcaster 32 can include one or more logic elements for performing various functions. As will be appreciated, the logic elements can be embodied in any of a number of different manners. In this regard, the logic elements performing the respective functions can be embodied in an integrated circuit assembly including one or more integrated circuits integral or otherwise in communication with a respective network entity (i.e., terminal, origin server, digital broadcast receiving terminal, digital broadcaster, etc.) or more particularly, for example, a processor 38 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 40, the processor 38 can also be connected to at least one interface or other means for displaying, transmitting and/or receiving data, content or the like. In this regard, the interface(s) can include at least one communication interface 42 or other means for transmitting and/or receiving data, content or the like, as well as at least one user interface that can include a display 44 and/or a user input interface 46. The user input interface, in turn, can comprise any of a number of devices allowing the entity to receive data from a user, such as a keypad, a touch display, a joystick or other input device. As more particularly explained below, for example, the user input interface can include one or more directional keys (hard and/or soft keys) for directionally selecting ordered items, such as ordered channels of content.

FIG. 3 illustrates a more particular functional diagram of a terminal 10, according to exemplary embodiments of the invention. It should be understood, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of voice and text communications systems, can readily employ the present invention.

The terminal 10 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 3, the terminal may include a transmitter 48, a receiver 50, and a controller 52 or other processor that provides signals to and receives signals from the transmitter and receiver, respectively. These signals include signaling information in accordance with the air interface standard of the applicable cellular system, and also user speech and/or user generated data. In this regard, the terminal can be configured to operate with one or more air interface standards, communication protocols, modulation types, and access types. More particularly, the terminal can be configured to operate in accordance with any of a number of first-generation (1G), second-generation (2G), 2.5G and/or third-generation (3G) communication protocols or the like. For example, the terminal may be configured to operate in accordance with 2G wireless communication protocols IS-136 (TDMA), GSM, IS-95 (CDMA) or the like. Also, for example, the terminal may be configured to operate in accordance with 2.5G wireless communication protocols GPRS, Enhanced Data GSM Environment (EDGE), or the like. The terminal can additionally or alternatively be configured to operate in accordance with any of a number of different digital broadcasting techniques, such as the DVB technique (e.g., DVB-T, ETSI Standard EN 300 744). The terminal can also be configured to operate in accordance with any of a number of different broadcast and/or multicast techniques, such as the MBMS technique (e.g., 3GPP TS 22.146). Further, the terminal can be configured to operate in accordance with ISDB-T, DAB, ATSC techniques or the like. Some narrowband AMPS (NAMPS), as well as TACS, terminals may also benefit from embodiments of the present invention, as should dual or higher mode terminals (e.g., digital/analog or TDMA/CDMA/analog phones).

It is understood that the controller 52 includes the circuitry required for implementing the audio and logic functions of the terminal. For example, the controller may be comprised of a digital signal processor device, a microprocessor device, and various analog to digital converters, digital to analog converters, and other support circuits. The control and signal processing functions of the terminal are allocated between these devices according to their respective capabilities. The controller thus also includes the functionality to convolutionally encode and interleave message and data prior to modulation and transmission. The controller can additionally include an internal voice coder (VC), and may include an internal data modem (DM). Further, the controller may include the functionally to operate one or more software applications, which may be stored in memory.

The terminal also comprises a user interface including a conventional earphone or speaker 54, a ringer 56, a microphone 58, a display 60, and a user input interface, all of which are coupled to the controller 52. The user input interface, which allows the terminal to receive data, can comprise any of a number of devices allowing the terminal to receive data, such as a keypad 62, a touch display (not shown) or other input device. In embodiments including a keypad, the keypad includes the conventional numeric (0-9) and related keys (#, *), and other keys used for operating the terminal. For example, the keypad can additionally or alternatively include directional keys (↑, ↓) for directionally selecting ordered items.

The terminal can also include one or more means for sharing and/or obtaining data from electronic devices, such as another terminal 10, an origin server 22, an AP 28, a digital broadcast receiving terminal 36, a digital broadcaster 32 or the like, in accordance with any of a number of different wireline and/or wireless techniques. For example, the terminal can include a radio frequency (RF) transceiver 64 and/or an infrared (IR) transceiver 66 such that the terminal can share and/or obtain data in accordance with radio frequency and/or infrared techniques. Also, for example, the terminal can include a Bluetooth (BT) transceiver 68 such that the terminal can share and/or obtain data in accordance with Bluetooth transfer techniques. Although not shown, the terminal may additionally or alternatively be configured to transmit and/or receive data from electronic devices according to a number of different wireline and/or wireless networking techniques, including LAN and/or WLAN techniques. In this regard, as shown in FIG. 1 with respect to terminal 10', the terminal may include an additional antenna or the like to transmit and/or receive data from such electronic devices (e.g., digital broadcaster).

The terminal can further include memory, such as a subscriber identity module (SIM) 70, a removable user identity module (R-UIM) or the like, which typically stores information elements related to a mobile subscriber. In addition to the SIM, the terminal can include other memory, such as volatile memory 72, and/or other non-volatile memory 74 (embedded and/or may be removable non-volatile memory). For example, the other non-volatile memory can comprise embedded or removable multimedia memory cards (MMCs), Memory Sticks manufactured by Sony Corporation, EEPROM, flash memory, hard disk or the like.

The memories 70, 72, 74 can store any of a number of pieces of information, and data, used by the terminal to implement the functions of the terminal. For example, the memories can store an identifier, such as an international mobile equipment identification (IMEI) code, uniquely identifying the terminal, such as to the MSC 16. The memories can also store one or more widgets for providing content such as headline news, exchange rates, sports results, stock quotes, weather forecasts, multilingual phrase dictionaries, encyclopedias, maps, entertainment listings, personal online calendars, or the like to a user.

In one or more configurations, a user of a terminal 10 may input desired data into the terminal, organize the data within the terminal, or display the information in a convenient manner. For example, a system for providing desired information in a terminal may include a system API (application program interface) through which a third-party widget source (e.g., origin server 22, digital broadcaster 32, etc.) may provide content to the terminal. In addition, the system may include a widget API for providing a standardized interface for communication with a user interface element including or otherwise displaying desired content. One such user interface element is commonly referred to as a "widget." In this regard, a widget may be considered a downloadable, interactive virtual tool (software tool) that provides content such as headline news, exchange rates, sports results, stock quotes, weather forecasts, multilingual phrase dictionaries, encyclopedias, maps, entertainment listings, personal online calendars, or the like to a user. A widget may be configured to continuously receive content, such as continuously updated content, from the widget source and/or one or more other sources, when the terminal or widget is operated in an on-line mode. The system API may communicate with the widget via the widget API, for example. Also, the widget may access information from third-party sources via the widget API. The widget may include one or more applications linked to one or more sources for accessing, sending and/or retrieving information from those sources without relying on a separate application. More particularly, for example, the widget may include one or more web applications linked to one or more web servers (e.g., origin servers) for accessing, sending and/or retrieving information from those web servers without relying on a separate web browser.

Widgets may be acquired in a variety of ways including through e-mail and/or by download from one or more sources, such as one or more origin servers 22 and/or digital broadcasters 32. As shown in the functional block diagram of FIG. 4, one or more widget sources 76 (e.g., origin server 22, digital broadcaster 32, etc.) may provide respective one or more widgets to a terminal 10. Additionally or alternatively, however, a particular source may offer to a terminal a service (shown as widget service 78) whereby the widget service collects widgets from one or more other widget sources, and provides the collected widgets to the terminal. And in further exemplary embodiments, whether the widget sources provide widgets to a terminal themselves or through a widget service, the widget service may monitor the content provided by the widgets and notify the terminal of changes in that content. The terminal may therefore download or otherwise obtain the changed content for display to the user.

Widgets may be arranged and displayed on a dashboard located in a particular area of the display of a terminal 10. Although reference may be made to arranging and displaying widgets, it should be understood that the arrangement and/or display of a widget may more particularly refer to content of the widget. In this regard, the content of a widget may include at various instances a representation (e.g., icon or other indicia) of the widget, and/or multimedia content presented by the widget.

A dashboard may refer to a predefined area of the display in which one or more widgets may be placed and organized. The dashboard provides delivery of messages from the widget API to the service or web server. The dashboard may further include a dashboard API for providing access to terminal resources and for presenting a user interface corresponding to a widget. The dashboard API may contain at least two parts. One part may be an API for the development of widgets such as design, placement on a display, content, etc. Another part of the dashboard API may be provided for third-party developers. In another example, the dashboard API may be built over a terminal operating system or over any other API available on the terminal. In another example, the system may also include a mobile gateway for creating and maintaining mobile connections between a terminal and a service.

As shown in FIGS. 5a and 5b, for example, the display 80 (e.g., display 44, 58) of a terminal 10 may present a dashboard 82 within which one or more widgets may be situated (widgets 84 and 86 being shown in the embodiment of FIG. 5a; and widgets 84-98 being shown in the embodiment of FIG. 5b). In this regard, the dashboard may be defined by a fixed area of the display dedicated to presenting one or more types of information such as widgets. The area occupied by dashboard may be set by the user or predefined by a system default. The dashboard may also be a flexible area that expands or contracts depending on the amount of information to be displayed. In instances where the dashboard has a fixed size, widgets from various sources may compete for space on a particular user's dashboard. In some cases, one spot, for example, the middle of dashboard, may be more desirable than a left or right position.

The dashboard 82 may also include a frame 102 for selecting and opening a widget 84-98 within the dashboard. The frame may be movable with respect to the widgets, or alternatively the widgets may be movable with respect to the frame, to align the frame with a particular widget to thereby select the widget for opening. When aligned with a particular widget, the frame may be displayed and/or applied as a border to the widget. The frame may further be colored to stand out from the coloring of the widgets. Additionally or alternatively, the frame's shape and size may be automatically modified to suit the shape and size of the widget with which the frame is aligned. The dashboard may further be configured so that the frame may be movable to an area of the dashboard not having any widgets to thereby show that no widgets are currently being selected.

Within a dashboard 82, the widgets 84, 86 may be represented by icons or other indicia 104 identifying the respective widgets. A user may then open a widget from the dashboard to direct the terminal to present the widget's content on the display 80. The opened widget may be presented in a number of different manners, such as in a remaining portion of the display (portion other than that occupied by the dashboard) or in a portion or all of the display without the dashboard, and thus the other widgets, also being presented by the display. As shown in FIG. 6a, the widget may be presented in a minimized view whereby the opened widget's icon or other indicia is presented by the display without the dashboard, and thus, the other widgets. Alternatively, as shown in FIG. 6b, the widget may be presented in a maximized view whereby the widget and its content 106 are presented by the display, again without the dashboard. Further, the display may be configured to selectively display the widget in its minimized or maximized views, such as in a manner as desired by the user.

In accordance with exemplary embodiments of the present invention, a widget (first widget) may be associated with one or more other widgets (e.g., second widget). During presentation of the widget, then, the one or more of the associated widget(s) may be advertised to the user to thereby encourage the user to select one or more of the associated, advertised widget(s). The selected widget(s) (e.g., second widget) may then be downloaded and/or presented for display by the user's terminal 10, such as in a manner similar to that of the widget (first widget) associated therewith. Although the content of the associated widgets may be uncorrelated to that of the widget with which they are associated, the content may alternatively be related to that of the respective widget. For example, a widget presenting a television programming guide may be associated with another widget configured to present content related to a movie theater (both being correlated by their relationship to entertainment options available to the user).

Reference is now made to FIGS. 7 and 8, which illustrate a functional block diagram and flowchart of a system and method according to exemplary embodiments of the present invention. As shown, similar to before, one or more widget sources 76 and/or widget services 78 may send one or more widgets to the terminal 10, such as by the terminal downloading those widgets from the respective source(s) and/or service(s), as shown in block 120 of FIG. 8. The widget sent to the terminal may be configured similar to typical widgets downloaded by the terminal. In accordance with exemplary embodiments of the present invention, however, the widget further includes one or more advertisement placeholders, or other references or links to one or more advertisements for subsequent receipt and presentation in conjunction with the respective widget. In this regard, the placeholder(s)/reference(s) may be associated with predetermined advertisement(s), or may be associated with later-determined advertisement(s). Although the widgets sent to the terminal may include a placeholder or other reference to one or more advertisements, it should be understood that in various instances the widgets may instead include the respective advertisements.

Before, after or as the widget source(s) 76 and/or widget service(s) 78 send widget(s) to the terminal 10, the source(s) and/or service(s) may receive, from one or more advertising sources 108, one or more widget advertisements directed to one or more widgets of the respective advertising sources, as shown in block 122. In this regard, the system may include one or more advertising sources 108 (e.g., origin server 22, digital broadcaster 32, etc.) that may function as widget sources for respective one or more widgets, but may also be configured to supply advertisements for those respective widget(s). The source(s) and/or service(s) receiving the advertisements, then, may associate the advertisement(s) with one or more widgets, as shown in block 124. The advertisements may be associated with widgets in any of a number of different manners, and under the direction of any of a number of different entities, including the respective advertising source, widget source and/or widget service. In one exemplary embodiment, the widgets may include identifiers (e.g., alphanumeric identifiers) that uniquely identify those widgets, as shown for example in FIG. 9a (also showing a status of the respective widgets). Similarly, the advertisements may also include identifiers that uniquely identify those advertisements, as shown for example in the data table of FIG. 9b. In such an embodiment, the advertisements may be associated with the widgets by associating the advertisements or, if provided, unique identifiers of the advertisements with identifiers of the respective widgets, as also shown in the data table FIG. 9a.

After the widget source(s) 76 and/or widget service(s) 78 send widget(s) to the terminal 10, the display 80 of the terminal may present the respective widget(s) 84-98, such as in a manner similar to that explained above. Additionally, the source(s) and/or service(s) may be configured to send, to the terminal for display in conjunction with the widget(s), one or more advertisements based on the placeholder(s)/reference(s) within those widget(s), as shown in block 126. In this regard, the advertisements sent to the terminal may be selected based on the identifier(s) of the respective widget(s) sent to the terminal, and the advertisement(s) (or unique identifiers of the respective advertisements) associated with those identifier(s).

More particularly, for example, the widget on the terminal 10 may be configured to send, to a source 76 or service 78, a request for an advertisement for another widget associated therewith. This request may include, for example, an address (e.g., IP address) of the respective source or service, the identifier of the respective widget, and an identifier of the terminal (or user of the terminal). Before sending the request, however, the widget may (but need not) be configured to request and receive the terminal user's acceptance of advertisements, such as via the terminal's user interface. The respective source or service may then determine whether the respective terminal/terminal user may receive advertisements (for, e.g., subscription services). If the terminal/terminal user may receive advertisements, the source or service may determine the appropriate advertisement based on the widget identifier (the widget identifier being associated with an advertisement identifier—see, e.g., FIG. 9a), and return the appropriate advertisement to the terminal.

The advertisements may be sent the terminal 10 in any of a number of different manners. In accordance with a pull technique, for example, a widget 84-98 may be configured or otherwise triggered to request one or more advertisements for the widget at one or more instances in response to presentation of the widget in the dashboard 82, opening of the widget, a change in the view of the opened widget (minimized view—see, e.g., FIG. 6a; or maximized view—see, e.g., FIG. 6b), passage of a given time period during presentation of the widget in the dashboard and/or a particular view of the opened widget, or the like. In accordance with a push technique, for example, the source(s) and/or service(s) may be configured to push the advertisements to the terminal at one or more instances in response to the terminal having received the respective widget, and/or in response to receiving an indication from the terminal related to presentation and/or opening of the respective widget (e.g., indication related to one or more of the triggering events explained above with respect to the pull technique). And in further embodiments, the advertisements may be sent the terminal in accordance with a combination of push and pull techniques. In either event, the advertisement(s) may be sent to the terminal for presentation directly or in directly in conjunction with the respective widget. In this regard, the advertisement(s) may be sent to the terminal for presentation directly in conjunction with the respective widget. Additionally or alternatively, however, the advertisement(s) may be sent to the terminal for presentation indirectly in conjunction with the respective widget, such as by being sent via email, SMS or other communication channels.

Figure 10A:
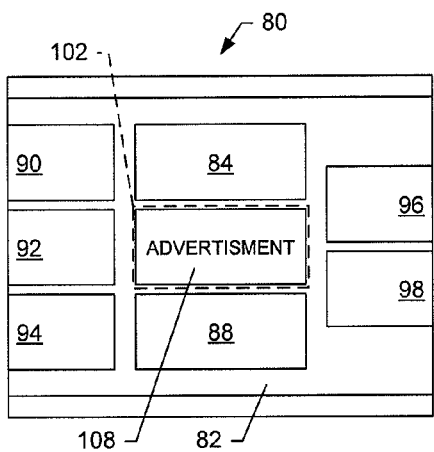
Figure 10B:
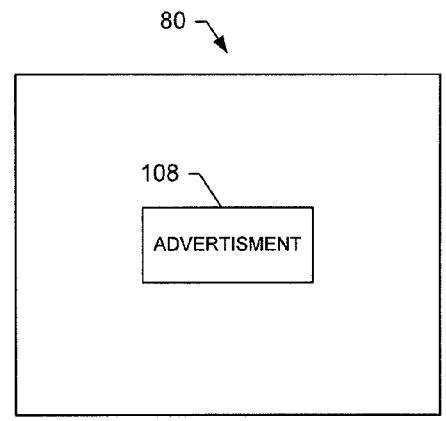
Figure 10C:
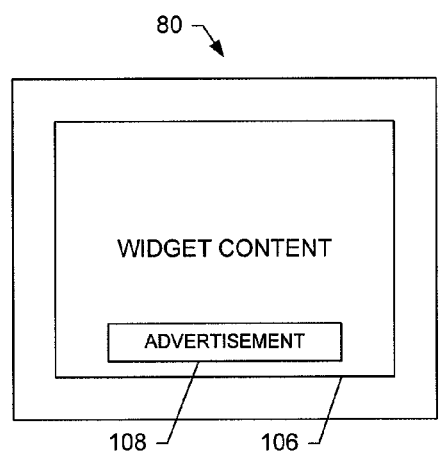

Regardless of how or when the advertisement(s) are sent to the terminal 10, the associated widget may be configured to present the advertisement(s). The widget may be configured to present the advertisement(s) in any of a number of different manners. As shown in FIG. 10*a*, for example, the widget may be configured to present the advertisement(s) 108 in place of the indicia of the respective widget in the dashboard 82 of the display 80, such as when the respective widget is aligned with the frame 102. Additionally or alternatively, for example, the widget may be configured to present the advertisement(s) in place of the respective widget's indicia in the minimized view of the widget once the widget has been opened, as shown in FIG. 10*b*. And further, for example, the widget may be configured to present the advertisement(s) along with the content of the respective widget in the maximized view of the widget once the widget has been opened, as shown in FIG. 10*c*.

The widget may be configured to present the advertisement(s) in a continuous or discontinuous manner. For example, the widget may be configured to continuously present the advertisement(s) when the advertisement(s) are presented along with the content of the respective widget (see, e.g., FIG. 10*c*). Also, for example, the widget may be configured to periodically present the advertisement(s) with a given duration and period, when the advertisement(s) are presented in place of the respective widget's indicia in the dashboard 82 or minimized view (see, e.g., FIGS. 10*a*, 10*b*). In such a periodic presentation, the widget may be configured to switch between the advertisement(s) for the given duration, and the indicia for the respective widget (see, e.g., FIGS. 5*b*, 6*a*) between periods of the given duration.

Regardless of how or when the widget presents the advertisement(s) in the display 80 of the terminal 10, if the user is interested in the advertised widget, the user may select and the terminal may receive selection of the advertisement. In this regard, the advertisement may comprise or include a selectable link or control to enable the user to select the advertisement. In response, the widget may initiate the terminal downloading or otherwise receiving the advertised widget by the terminal. Before, downloading or otherwise receiving the advertised widget, however, it may be desirable for the user to receive further information as to the advertised widget so that the user may more effectively assess the user's interest in the widget. Thus, in one exemplary embodiment, in response to receiving selection of the advertisement, the widget may send a request for additional information as to the advertised widget. In this regard, the request may be sent to, and received by, the widget source 76 or service 78 from which the terminal received the respective widget, or the advertising source 108 originating the advertisement and the advertised widget, as shown in block 128.

Figure 11:
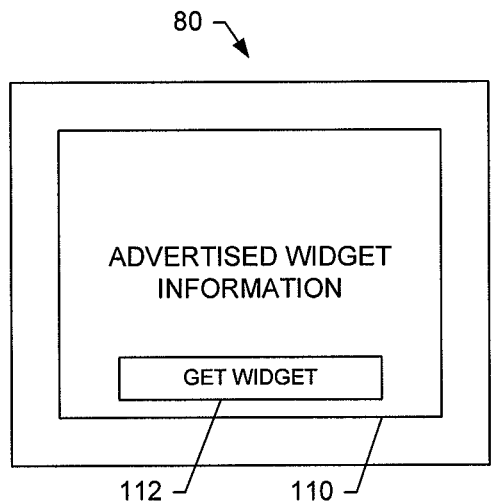
Figure 12:
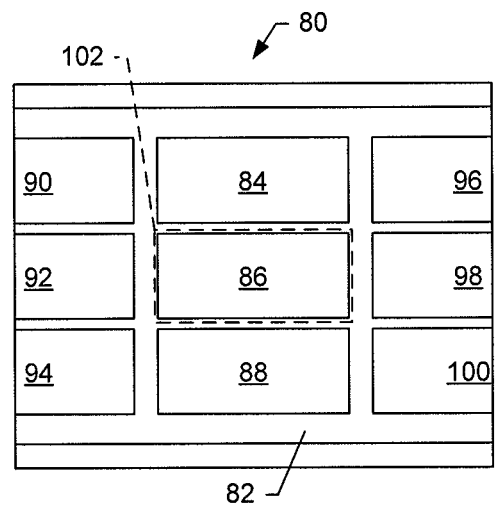

In response to the request, and as also shown in block 128, the widget source 76, service 78 or advertising source 108 may send, to the terminal 10, the requested additional information related to the advertised widget. This information may be sent in any of a number of different forms. For example, the information may be sent as content configured for presentation by the widget that presented the advertisement and requested the additional information. Alternatively, the information may be sent as a separate advertising widget configured for operation by the terminal in a manner similar to other widgets. Regardless of the manner and form of sending the additional information, the terminal may receive and present the additional information 110 in the display 80, as shown in FIG. 11.

As or after the terminal 10 presents the additional information 110, again if the user is interested in the advertised widget, the user may direct and the terminal may receive direction, to download the advertised widget, such as via a control 112 presented along with the additional information. In response, the widget presenting the additional information, or separate advertising widget, may initiate the terminal downloading or otherwise receiving the advertised widget. For example, the advertised widget may be downloaded from a widget service 78 or the advertising source 108 originating the advertisement and the advertised widget. In this regard, the service or advertising source may receive a request for the advertised widget, to which the respective network entity may respond by sending the requested, advertised widget to the terminal, as shown in block 130. Then, on receipt of the advertised widget, the terminal may install the widget for use on the terminal, including adding the advertised widget to the dashboard 82 of the display 80, shown as added widget 100 in FIG. 12 (compare, e.g., FIG. 5*b*).

The inclusion of advertisements in widgets may be part of an advertising campaign for the respective advertised widgets. In this regard, the advertising campaign may be defined for one or more particular widgets (advertised widget), for a particular time, and may include a target number of advertised widgets to send to users (or rather respective terminals 10). The advertising campaign may also include identification of one or more widgets for association with the advertised widgets so that the advertisements may be presented by the respective widgets. Further, the advertising campaign may identify target geographies (e.g., countries), terminal models or the like with which to advertise; and may identify characteristics (or profiles) of users to which to advertise.

And as such, in conjunction with an advertising campaign, or more generally in conjunction with providing the widgets, advertisements and/or advertised widgets to terminals 10, one or more of the widget sources 76, services 78 and/or advertising sources 108 may be configured to generate, track and/or maintain various data and/or statistics. This data and/or statistics may relate to the widgets including advertisements, the advertisements and/or the advertised widgets to thereby monitor one or more advertising campaigns. More particularly, for example, the data and/or statistics may include the number of advertised widgets to be sent to users (or rather respective terminals 10), and may identify the geographies (e.g., countries), terminal models or the like to which widgets including the respective advertisements have been sent, and/or to which the advertised widget has been sent. Additionally, the data and/or statistics may identify characteristics (or profiles) of users to which widgets including the respective advertisements have been sent, and/or to which the advertised widget has been sent. Further, for example, the data and/or statistics may include data and/or statistics related to how often the widgets including the advertisements are used or otherwise opened.

As explained above, a widget may be associated with one or more other widgets, and accordingly, one or more advertisements for those one or more widgets. In a more particular example, a widget may include a plurality of selectable or separately presentable items, each of which may be associated with a different advertisement for the same widget or a different widget (e.g., advertisements from different entities). Alternatively, a widget may include a plurality of selectable or separately presentable items, each of which may be associated with a different variation of the same advertisement for the same widget or a different variation of the same widget (e.g., advertisements from the same entity). Similar to the widgets and advertisements, these items may also identifiers (e.g., alphanumeric identifiers) that uniquely identify those items. Thus, for items associated with different advertisements, a widget identifier may be associated with multiple item identifiers, each of which is associated with an advertisement identifier, as shown in FIG. 13. Alternatively, for items associated with different variations of the same advertisement, an advertisement identifier may be associated with multiple item identifiers, each of which is associated with a different variation of the same advertisement, as shown in FIG. 14. Thus, for example, the data table of FIG. 9*a* may be implemented in conjunction with the data table of FIG. 14. Or, for example, the data table of FIG. 13 may be implemented in conjunction with the data table of FIG. 9*b*.

In instances in which a widget includes selectable items, for example, the widget on the terminal 10 may be configured to send, to a source 76 or service 78, a request for an advertisement for another widget associated therewith. This request may include, for example, an address (e.g., IP address) of the respective source or service, the identifier of the respective widget, the identifier of a selectable item of the respective widget, and an identifier of the terminal (or user of the terminal). Again, before sending the request, however, the widget may (but need not) be configured to request and receive the terminal user's acceptance of advertisements, such as via the terminal's user interface. The respective source or service may then determine whether the respective terminal/terminal user may receive advertisements (for, e.g., subscription services). If the terminal/terminal user may receive advertisements, the source or service may determine the appropriate advertisement based on the widget identifier and item identifier, and return the appropriate advertisement to the terminal. The entities may then operate in a manner similar to before.

As also shown and explained above, the widget sources 76, widget services 78 and advertising sources 108 are separate network entities. In some embodiments, however, one or more entities may support one or more of a widget source, service or advertising source, logically separated but co-located within the entit(ies). For example, a single entity may support a logically separate, but co-located, widget source and widget service. Also, for example, a single entity may support a logically separate, but co-located widget service and advertising source. And further, for example, a single entity may support a logically separate, but co-located widget source, widget service and advertising source.

As also explained above, the widget and associated widget(s) may comprise separate widgets installed and operated separate from one another on the terminal 10. In various instances, however, one or more of the associated widget(s) may be installed and operated embedded within the widget with which the respective widget(s) are associated. The widget may therefore further include an API for capturing the embedded, associated widget(s). The API, then, may be coupled to one or more fields of the widget within which to embed the associated one or more widgets. To permit presentation of content of the embedded widget(s) within content of the widget, the field(s) of the widget may be sized smaller than the presentation of content of the widget so as to fit the content of the embedded widget(s) therewithin. If so desired, the field(s) may correspond to the placeholder(s) for the advertisement(s) for the respective associated widget(s). The API, then, may be further configured to capture the advertisement requested, and received from, the widget source(s) 76 and/or service(s) 78; and the advertisement(s) may be coupled to the respective associated widget(s).

According to one exemplary aspect of the present invention, the functions performed by one or more of the entities of the system, such as the terminal 10, digital broadcast receiving terminal 36, and/or a digital broadcaster 32, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIGS. 7 and 8 are a functional block diagram and flowchart, respectively, of systems, methods and program products according to exemplary embodiments of the present invention. It will be understood that each block or step of the functional block diagram and flowchart, and combinations of blocks in the functional block diagram and flowchart, can be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (i.e., hardware) create means for implementing the functions specified in the block(s) or step(s) of the functional block diagram and flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the functional block diagram and flowchart. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the functional block diagram and flowchart.

Accordingly, blocks or steps of the flowcharts support combinations of means for performing the specified functions, combinations of steps for performing the specified functions and program instruction means for performing the specified functions. It will also be understood that one or more blocks or steps of the functional block diagram and flowchart, and combinations of blocks or steps in the functional block diagram and flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a processor, and
   a memory including computer program code, the memory and computer program code configured to, with the processor, cause the apparatus to at least perform:
   preparing a first widget for transmission to a mobile terminal, the first widget being associated with a second widget, the mobile terminal being configured to present content of the first widget in a display of the mobile terminal and in a manner including a content item related to the second widget;
   receiving, from the mobile terminal, a request for the second widget based on the presentation of content of the first widget including the content item related to the second widget; and
   preparing the second widget for transmission to the mobile terminal in response to the request, the mobile terminal being configured to receive the second widget, embed the second widget within the first widget, and present content of the second widget in the display, the first widget being presented on a dashboard.

2. An apparatus according to claim 1,
   wherein the memory and computer program code are further configured to, with the processor, cause the apparatus to at least perform the following:
   receiving, from the mobile terminal, a request for additional content related to the second widget based on the presentation of content of the first widget including the content item related to the second widget; and
   preparing the additional content for transmission to the mobile terminal, the mobile terminal being configured to present the additional content in the display,
   wherein receiving a request for the second widget comprises receiving a request for the second widget based on the presentation of the additional content related to the second widget.

3. An apparatus according to claim 1, wherein the memory and computer program code are further configured to, with the processor, cause the apparatus to at least perform the following:
   preparing, for transmission to the mobile terminal, the content item related to the second widget before the mobile terminal presents content of the first widget including the content item related to the second widget.

4. An apparatus according to claim 1, wherein the memory and computer program code are further configured to, with the processor, cause the apparatus to at least perform the following:
   receiving, from the mobile terminal, a request for the content item related to the second widget before preparing the respective content for transmission to the mobile terminal, the mobile terminal being configured to send the request based on presentation of an indicia of the first widget.

5. An apparatus according to claim 4, wherein receiving a request for the content item related to the second widget comprises receiving a request for the content item related to the second widget from the mobile terminal configured to send the request based on presentation of the indicia of the first widget in a dashboard in the display, the dashboard including indicia for each of a plurality of widgets.

6. An apparatus according to claim 4, wherein receiving a request for the content item related to the second widget comprises receiving a request for the content item related to the second widget from the mobile terminal configured to send the request based on presentation of the indicia of the first widget in a minimized view of the first widget.

7. An apparatus according to claim 1, wherein the memory and computer program code are further configured to, with the processor, cause the apparatus to at least perform the following:
   receiving, from the mobile terminal, a request for the content item related to the second widget before preparing the respective content for transmission to the mobile terminal, the mobile terminal being configured to send the request based on presentation of content of the first widget in a maximized view of the widget.

8. An apparatus comprising:
   a processor; and
   a memory including computer program code, the memory and computer program code configured to, with the processor, cause the apparatus to at least perform:
   causing presentation of content of a first widget in a display and on a dashboard presented in the display, the first widget being associated with a second widget configured for operating within the first widget;
   causing, in the display, presentation of a content item related to the second widget, the content item being presented in a predetermined relationship with respect to presentation of the content of the first widget; and
   initiating a request, to another apparatus, to receive the second widget, the request being initiated based on the presentation of the content item.

9. An apparatus according to claim 8, wherein the memory and computer program code are further configured to, with the processor, cause the apparatus to at least perform the following:
   receiving the content item from another apparatus before the presentation of the content item.

10. An apparatus according to claim 9, wherein receiving the content item comprises receiving the content item in conjunction with a campaign, the campaign being defined based on one or more of one or more geographies, one or more apparatus models, one or more user profiles, the first widget or a number of times another apparatus has distributed the first widget.

11. An apparatus according to claim 8, wherein causing presentation of content comprises causing presentation of content including an indicia of the first widget, and
    wherein causing presentation of a content item comprises causing presentation of a content item in place of the indicia of the first widget for at least a predefined period of time.

12. An apparatus according to claim 11, wherein causing presentation of content and causing presentation of a content item comprise periodically switching between causing presentation of the indicia of the first widget and the content item.

13. An apparatus according to claim 11, wherein causing presentation of content comprises causing presentation of the indicia of the first widget in a dashboard including indicia of each of a plurality of widgets.

14. An apparatus according to claim 8, wherein the first widget has an identifier with which the second widget is associated, the initiated request to receive the second widget including the respective identifier.

15. An apparatus according to claim 8, wherein the memory and computer program code are further configured to, with the processor, cause the apparatus to at least perform the following:
receiving the second widget in response to the request;
embedding the second widget within the first widget; and
causing, in the display, presentation of content of the second widget embedded within content of the first widget.

16. An apparatus according to claim 15, wherein the first widget includes an interface configured to capture the second widget received by the apparatus.

17. An apparatus according to claim 16, wherein the first widget further includes a field coupled to the interface for receiving content of the second widget for presentation in the display.

18. An apparatus according to claim 17, wherein the field is sized smaller than the presentation of content of the first widget so as to fit content of the second widget therewithin.

19. An apparatus according to claim 17, wherein the field is further configured to receive the content item related to the second widget.

20. An apparatus according to claim 8, wherein the content item is coupled to the second widget.

21. An apparatus according to claim 8, wherein initiating a request comprises initiating a request to another apparatus configured to send the second widget to the apparatus only by request.

22. An apparatus according to claim 8, wherein causing presentation of content comprises causing presentation of an indicia of the first widget in a dashboard including indicia of each of a plurality of widgets, and wherein the memory and computer program code are further configured to, with the processor, cause the apparatus to at least perform the following:
receiving the second widget in response to the request; and
causing presentation of indicia of the second widget in the dashboard along with indicia of each of the plurality of widgets including the first widget.

23. An apparatus according to claim 8, wherein the memory and computer program code are further configured to, with the processor, cause the apparatus to at least perform the following:
receiving the second widget in response to the request; and
continuously receiving, and causing presentation of, content of the second widget when the apparatus is operated in an on-line mode.

24. A method comprising:
preparing a first widget for transmission to a mobile terminal, the first widget being associated with a second widget, the mobile terminal being configured to present content of the first widget on a dashboard presented in a display of the mobile terminal and in a manner including a content item related to the second widget;
receiving, from the mobile terminal, a request for the second widget based on the presentation of content of the first widget including the content item related to the second widget; and
preparing the second widget for transmission to the mobile terminal in response to the request, the mobile terminal being configured to receive the second widget, embed the second widget within the first widget, and present content of the second widget in the display and within the content of the first widget,
wherein at least one of preparing a first widget or preparing the second widget are performed by an apparatus comprising a processor configured to at least one of prepare a first widget or prepare the second widget.

25. A method according to claim 24 further comprising:
receiving, from the mobile terminal, a request for additional content related to the second widget based on the presentation of content of the first widget including the content item related to the second widget; and
preparing the additional content for transmission to the mobile terminal, the mobile terminal being configured to present the additional content in the displayed,
wherein receiving a request for the second widget comprises receiving a request for the second widget based on the presentation of the additional content related to the second widget.

26. A method according to claim 24 further comprising:
preparing, for transmission to the mobile terminal, the content item related to the second widget before the mobile terminal presents content of the first widget including the content item related to the second widget.

27. A method according to claim 24 further comprising:
receiving, from the mobile terminal, a request for the content item related to the second widget before preparing the respective content for transmission to the mobile terminal, the mobile terminal being configured to send the request based on presentation of an indicia of the first widget.

28. A method according to claim 27, wherein receiving a request for the content item related to the second widget comprises receiving a request for the content item related to the second widget from the mobile terminal configured to send the request based on presentation of the indicia of the first widget in a dashboard in the display, the dashboard including indicia for each of a plurality of widgets.

29. A method according to claim 27, wherein receiving a request for the content item related to the second widget comprises receiving a request for the content item related to the second widget from the mobile terminal configured to send the request based on presentation of the indicia of the first widget in a minimized view of the first widget.

30. A method according to claim 24 further comprising:
receiving, from the mobile terminal, a request for the content item related to the second widget before preparing the respective content for transmission to the mobile terminal, the mobile terminal being configured to send the request based on presentation of content of the first widget in a maximized view of the widget.

31. A method comprising:
causing presentation of content of a first widget on a dashboard presented in a display, the first widget being associated with a second widget;
causing, in the display, presentation of a content item related to the second widget, the content item being presented in a predetermined relationship with respect to presentation of the content of the first widget; and
initiating a request, to another apparatus, to receive the second widget configured for embedding and operating within the first widget, the request being initiated based on the presentation of the content item,
wherein causing presentation of a first widget, causing presentation of a content item and initiating a request are performed by an apparatus comprising a processor configured to cause presentation of a first widget, cause presentation of a content item and initiate a request.

32. A method according to claim 31 further comprising:
receiving the content item from another apparatus before the presentation of the content item.

33. A method according to claim 32 wherein receiving the content item comprises receiving the content item in conjunction with a campaign, the campaign being defined based on one or more of one or more geographies, one or more apparatus models, one or more user profiles, the first widget or a number of times another apparatus has distributed the first widget.

34. A method according to claim 31, wherein causing presentation of content comprises causing presentation of content including an indicia of the first widget, and
  wherein causing presentation of a content item comprises causing presentation of a content item in place of the indicia of the first widget for at least a predefined period of time.

35. A method according to claim 34, wherein causing presentation of content and causing presentation of a content item comprise periodically switching between causing presentation of the indicia of the first widget and the content item.

36. A method according to claim 34, wherein causing presentation of content comprises causing presentation of the indicia of the first widget in a dashboard including indicia of each of a plurality of widgets.

37. A non-transitory computer-readable storage medium having computer-readable program code portions stored therein, the computer-readable storage medium and computer-readable program code portions being configured to, with a processor, cause an apparatus to at least perform:
  preparing a first widget for transmission to a mobile terminal, the first widget being associated with a second widget, the mobile terminal being configured to present content of the first widget on a dashboard presented in a display of the mobile terminal and in a manner including a content item related to the second widget;
  receiving, from the mobile terminal, a request for the second widget based on the presentation of content of the first widget including the content item related to the second widget; and
  preparing the second widget for transmission to the mobile terminal in response to the request, the mobile terminal being configured to receive the second widget, embed the second widget within the first widget, and present content of the second widget in the display and within the first widget.

38. A non-transitory computer-readable storage medium according to claim 37, wherein the computer-readable storage medium and computer-readable program code portions are further configured to, with the processor, cause the apparatus to at least perform:
  receiving, from the mobile terminal, a request for additional content related to the second widget based on the presentation of content of the first widget including the content item related to the second widget; and
  preparing the additional content for transmission to the mobile terminal, the mobile terminal being configured to present the additional content in the display,
  wherein receiving a request for the second widget comprises receiving a request for the second widget based on the presentation of the additional content related to the second widget.

39. A non-transitory computer-readable storage medium according to claim 37, wherein the computer-readable storage medium and computer-readable program code portions are further configured to, with the processor, cause the apparatus to at least perform:
  preparing, for transmission to the mobile terminal, the content item related to the second widget before the mobile terminal presents content of the first widget including the content item related to the second widget.

40. A non-transitory computer-readable storage medium according to claim 37 wherein the computer-readable storage medium and computer-readable program code portions are further configured to, with the processor, cause the apparatus to at least perform:
  receiving, from the mobile terminal, a request for the content item related to the second widget before preparing the respective content for transmission to the mobile terminal, the mobile terminal being configured to send the request based on presentation of an indicia of the first widget.

41. A non-transitory computer-readable storage medium according to claim 40, wherein receiving a request for the content item related to the second widget comprises receiving a request for the content item related to the second widget from the mobile terminal configured to send the request based on presentation of the indicia of the first widget in a dashboard in the display, the dashboard including indicia for each of a plurality of widgets.

42. A non-transitory computer-readable storage medium according to claim 40, wherein receiving a request for the content item related to the second widget comprises receiving a request for the content item related to the second widget from the mobile terminal configured to send the request based on presentation of the indicia of the first widget in a minimized view of the first widget.

43. A non-transitory computer-readable storage medium according to claim 37, wherein the computer-readable storage medium and computer-readable program code portions are further configured to, with the processor, cause the apparatus to at least perform:
  receiving, from the mobile terminal, a request for the content item related to the second widget before preparing the respective content for transmission to the mobile terminal, the mobile terminal being configured to send the request based on presentation of content of the first widget in a maximized view of the widget.

44. A non-transitory computer-readable storage medium, having computer-readable program code portions stored therein, the computer-readable storage medium and computer-readable program code portions being configured to'with a processor, cause an apparatus to at least perform:
  causing presentation of content of a first widget in a display; the first widget being associated with a second widget configured for operating within the first widget;
  causing, in the display, presentation of a content item related to the second widget, the content item being presented in a predetermined relationship with respect to presentation of the content of the first widget; and
  initiating a request, to a network entity another apparatus, to receive the second widget, the request being initiated based on the presentation of the content item.

45. A non-transitory computer-readable storage medium according to claim 44, wherein the computer-readable storage medium and computer-readable program code portions are further configured to, with the processor, cause the apparatus to at least perform:
  receiving the content item from another apparatus before the presentation of the content item.

46. A non-transitory computer-readable storage medium according to claim 45, wherein receiving the content item comprises receiving the content item in conjunction with a campaign, the campaign being defined based on one or more of one or more geographies, one or more apparatus models, one or more user profiles, the first widget or a number of times another apparatus has distributed the first widget.

47. A non-transitory computer-readable storage medium according to claim 44, wherein causing presentation of content comprises causing presentation of content including an indicia of the first widget, and
   wherein causing presentation of a content item comprises causing presentation of a content item in place of the indicia of the first widget for at least a predefined period of time.

48. A non-transitory computer-readable storage medium according to claim 47, wherein causing presentation of content and causing presentation of a content item comprise periodically switching between causing presentation of the indicia of the first widget and the content item.

49. A non-transitory computer-readable storage medium according to claim 47, wherein causing presentation of content comprises causing presentation of the indicia of the first widget in a dashboard including indicia of each of a plurality of widgets.

* * * * *